United States Patent [19]

Trytek

[11] 4,407,512
[45] Oct. 4, 1983

[54] HIGH PRESSURE ROTARY MECHANICAL SEAL

[75] Inventor: Joseph J. Trytek, Chicago, Ill.

[73] Assignee: John Crane-Houdaille, Inc., Chicago, Ill.

[21] Appl. No.: 790,328

[22] Filed: Apr. 25, 1977

Related U.S. Application Data

[63] Continuation of Ser. No. 646,335, Jan. 2, 1976, abandoned.

[51] Int. Cl.³ .......................... F16J 15/16; F16J 15/40
[52] U.S. Cl. .................................................. 277/96.1
[58] Field of Search ....................... 277/96, 96.1, 81 R

[56] References Cited

U.S. PATENT DOCUMENTS

| 2,944,843 | 7/1960 | Colby | 277/96 |
| 3,499,653 | 3/1970 | Gardner | 277/96.1 |
| 3,957,276 | 5/1976 | Wiese | 277/96.1 |

Primary Examiner—Robert I. Smith
Attorney, Agent, or Firm—Dorsey L. Baker

[57] ABSTRACT

A seal for high pressure, large diameter applications wherein three factors, each individually known in the prior art, are combined to provide a seal which is capable of operating in such applications. These factors are (1) a ratio of face width to the inner radius of the face in the range of 0.085 to 0.30; (2) hydrodynamic lift-off pads; and (3) controlled negative rotation of the sealing rings.

6 Claims, 2 Drawing Figures

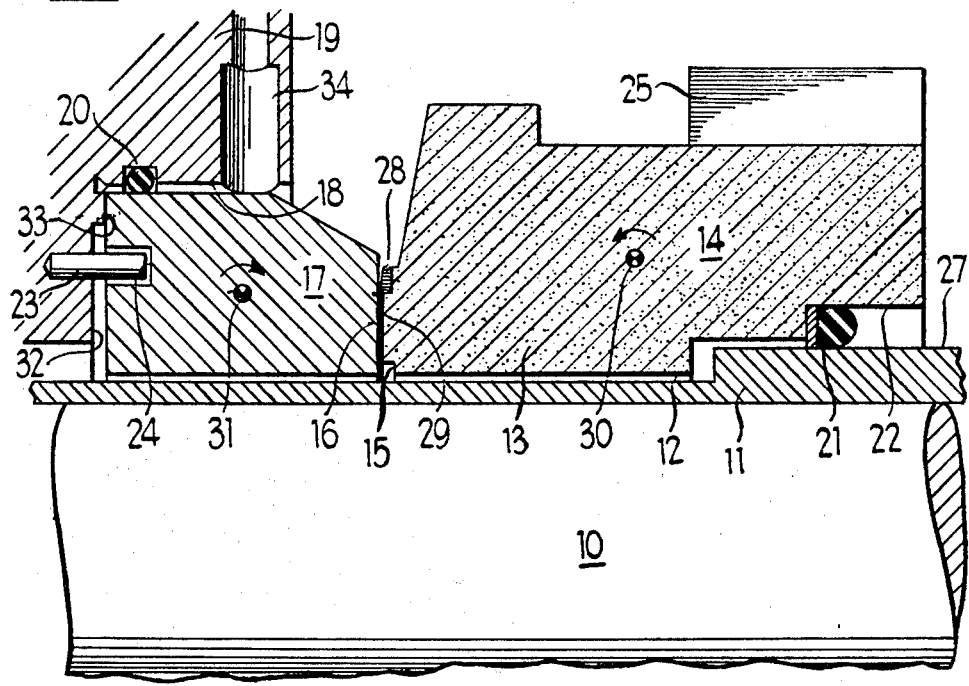
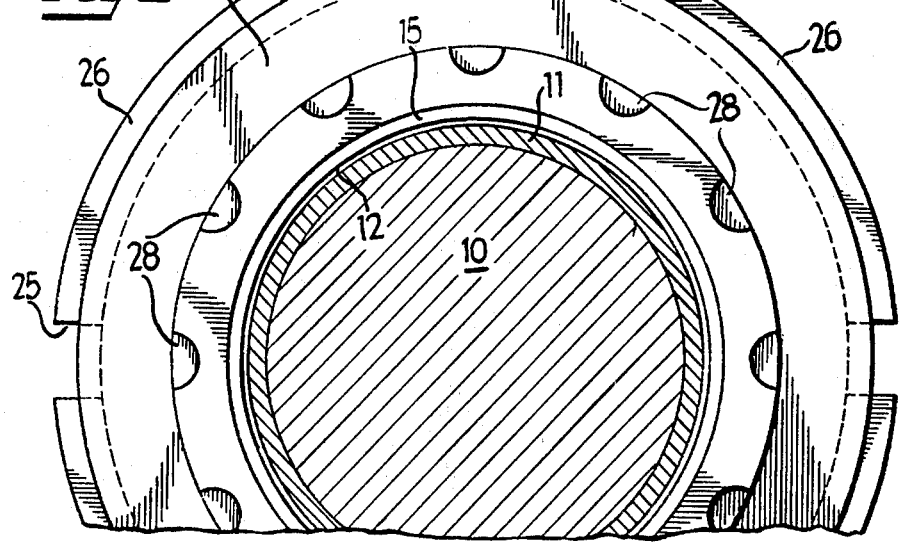

HIGH PRESSURE ROTARY MECHANICAL SEAL

This is a continuation, of application Ser. No. 646,335, filed Jan. 2, 1976, now abandoned.

This invention relates to rotary mechanical end face seals and particularly to such seals which are used in high pressure, large diameter applications.

End face seals depend upon the constant flatness and parallelity of their cooperating radially disposed faces for the effectiveness of the seal produced by these faces. Initially, the faces are lapped flat and smooth so that when placed together, there is no space through which the fluid to be sealed can escape. In use, however, these faces are subjected to uneven wear because of (1) differing linear speeds of the faces produced by the differing radii of the faces; (2) lack of homogeneity of the material of the faces; (3) distortion of the faces by the pressure of the fluid on the rings on which the faces are formed; and (4) poor lubrication.

The first factor cannot be eliminated since it is inherent in the operation of two flat surfaces rubbing together with a rotating movement.

The second factor can be controlled to some extent, but since the material of the rings is determined by the nature of the fluid to be sealed, the choice of material is limited. In high pressure, large diameter water applications, one of the sealing rings is made of carbon. This material is difficult to mold in such manner that it is perfectly homogeneous in the large diameters and masses required to withstand the pressures encountered.

The third factor has lead to various balancing arrangements and to increases in the amount of material in the ring, the latter to provide greater stiffness to resist the pressure of the fluid. However, balancing is effective in an axial direction and has little or no effect upon radial pressure differences which are largely responsible for pressure distortion in the ring. Increasing the mass of the ring aggravates the difficulty in assuring homogeneity in the material of the ring.

The fourth factor is more difficult to detect than to remedy.

Over the years, seal designers have evolved certain design principles which serve to assist them in solving seal design problems. These are (a) increased seal balancing to reduce axial pressure on the seal faces and, hence, wear of said faces, (b) increased face width to reduce unit pressure on the faces, (c) zero turning moment of the ring and seat about the centroid of their axial sections at operating pressures to assure parallelity of the seal faces and, hence, even wear thereacross, and (d) the use of relieved areas (hydro-pads) on at least one seal face to draw lubricant between the faces when they move relative to one another.

However, seals are desired for devices producing the following operating conditions:
 1. Differential pressures from 0 to 2,500 PSIG.
 2. 8" to 9-½" outside diameter of the sealing faces.
 3. 2,750 fpm surface velocity.
 4. Temperature transients of 20° F. in 7.5 mins.
 5. Pressure changes in increments of 500 PSIG./min., both increasing and decreasing the pressure, in the overall range of 0 to 2,500 PSIG.
 6. Leakage rates of 15 cc/min. under extreme conditions.

It has been found that following the classical design principles outlined above does not produce a satisfactory seal for such operating conditions. It is, accordingly, an object of this invention to provide a seal which is satisfactory under the operating conditions given above.

I have found that a seal having the following three properties will operate satisfactorily under the above operating conditions:

1. An aspect ratio in the range of 0.085 to 0.30. The term "aspect ratio" is defined as the ratio of the radial sealing face width to the inner radius of the face.

2. Hydrodynamic lift-off pads incorporated into the design to allow the seal to operate on a thicker interfacial film.

3. Controlled negative rotation of the sealing rings. "Negative rotation" of a sealing ring is defined as that direction of rotation of the seal ring about its centroid which will pinch off face leakage at the outer diameter or pressure side of the ring.

Considering the effect of each of these properties on the operation of the seal, it is known that there is a radial pressure drop across a seal face from the pressure side to the opposite side and, hence, a narrow face will provide a more abrupt pressure drop than a wide face. A wide face, however, increases friction between the sealing rings and accentuates the differences in linear velocities between the inner and outer diameters which, in turn, produces differential face wear and non-flat sealing surfaces. I have found that it is possible to arrive at a face width which is related to the inner radius of the face in a particular ratio to give minimum wear due to differential velocities of the inner and outer portions of the face and at the same time result in a pressure drop across the faces which is tolerable.

The hydrodynamic lift-off pads improve the lubrication condition at the seal interface and thereby generate less input heat, thus minimizing thermal distortion. The latter, when present, renders the operation of the seal less predictable, i.e., less stable.

Negative rotation of one or both rings has the effect of turning the outside portion of the ring toward the other ring to pinch off face leakage at the outside diameter of the rings. This tends to compensate for the thermal distortion of the rings which occurs when there is a downward temperature gradient from the rubbing faces axially outwardly.

A seal in which the above features are incorporated is shown in the accompanying drawings, in which:

FIG. 1 is a radial section through the seal; and

FIG. 2 is an elevational view of one ring, the face of which has been modified in accordance with this invention.

In FIG. 1, a shaft 10 is shown on which is mounted a sleeve 11 having a step 12 into which a radially inner portion 13 of a primary sealing ring 14 projects to effect a partial balance of the axial forces acting upon said ring. The latter may be made of molded carbon in washer form to surround sleeve 11, the ring being machined to have a raised portion or nose 15 extending axially from the body thereof. Raised portion 15 has a flat-lapped surface 16 which functions as the sealing face of the primary sealing ring.

Immediately axially adjacent primary sealing ring 14 is a mating ring 17 or seat made of appropriate material and held in a recess 18 in a gland plate 19 or other fixed part of the device to be sealed. An "O" ring 20 of elastomeric material seals the radially outer cylindrical surface of mating ring 17 with respect to gland plate 19, and an "O" ring 21 operating in a counterbore 22 in primary ring 14 seals said primary ring with respect to the outer surface 27 of sleeve 11. One or more pins 23 secured to gland plate 19 and extending axially into recesses 24 in the rear radial face of mating ring 17 hold said seat ring against rotation relative to gland plate 19.

Primary ring 14 is formed with axially extending slots 25 (FIGS. 1 and 2) disposed preferably at 90° intervals in the outer periphery of a radially extending flange 26 located at the rear of ring 14.

A portion of sealing face 16 has a smaller radius than the outer surface 27 of sleeve 11 on which "O" ring 21 rests. Ring 14 is exposed at both ends to the fluid under pressure to be sealed and, hence, the axial pressure of the fluid acting upon one end opposes the fluid pressure acting upon the other end of said ring. The latter pressure, however, is designed to be slightly greater than the fluid pressure on the said one end so that a closing pressure is still exerted by the fluid upon ring 14.

Balancing a primary sealing ring to a predetermined degree is a basic requirement of all high pressure seals. It is understood that the combination of three properties of this invention are to be applied to an appropriately balanced seal.

Considering now the first property mentioned above, viz., the particular aspect ratio found essential, it may be noted that in the example shown, the inner radius of face 16 is 4.150 inches (10.541 centimeters) and the radial dimension of face 16 is 0.443 inches (1.125 centimeters) so that the aspect ratio of face 16 as defined above is 0.443/4.150 or 0.107, which is within the required range of aspect ratios given above.

Next, in the same example, and as shown in FIG. 2, the radially outer portion of the face 16 is formed with essentially semi-circular shallow recesses 28 which serve, when the seal is operating, to force fluid between face 16 and the radial face 29 on seat ring 17 to reduce friction between said faces. Such recesses generally known as hydro-pads.

Taking up now the third property negative moment, each ring 14 and 17 has in radial section a center of gravity or centroid shown at 30 and 31, respectively. Fluid pressures upon selected portions of the rings will develop moments of force around the centroid of each ring tending to twist it about its centroid in the direction of the algebraic sum of such moments. Thus, the contour of the primary and mating rings in radial cross section, when each ring is exposed to fluid pressure between its seal face and secondary seal, will determine whether there will be a twisting force on the rings, and if so, whether it will be clockwise or counterclockwise around the centroid of each ring.

It has been proposed previously to use a contour for the radial cross section of a primary sealing ring which will result in a zero moment of force around the centroid of the ring so that the sealing faces will remain flat for all expected pressures of the fluid. Such zero moment, however, is not satisfactory in the environment for which the seal of this invention is intended. It is known, for example, that during operation of a seal under the conditions of this invention, the friction developed between faces 16 and 29 will produce a downward temperature gradient on ring 14 away from the contacting faces, and that this gradient will produce maximum radial expansion at the face, with progressively less expansion away from the faces. Such differential expansion is the equivalent of a turning moment in a primary ring about its centroid in a clockwise direction when ring 14 in FIG. 1 is considered. A zero moment based solely upon the geometry of the radial cross section of the primary ring would, therefore, allow the distortion produced by the temperature gradient to develop unhindered.

By designing the net moment around centroid 30 to be in a counterclockwise negative direction as viewed in FIG. 1, the thermal distortion is counteracted and the flatness of face 16 is preserved. Assuming that seat ring 17 is relatively undistorted by pressure and temperature gradients, a negative moment in primary ring 14 will be sufficient to maintain face 16 thereof flat and in sealing engagement with face 29 of seat ring 17. Should ring 17, however, be affected by temperature, then the pressure of the fluid being sealed upon seat ring 17 is controlled in such manner as to result in a negative moment of force about centroid 31 of said seat ring 17.

In the example shown in FIG. 1, a negative moment is produced in seat ring 17 be relieving the bottom surface 32 of recess 18 radially outwardly to leave a land 33 which is radially beyond centroid 31. Thus, axial pressure on seat ring face 29 will result in a turning moment about centroid 31 in a clockwise direction as viewed in FIG. 1 which, according to the definition given above is negative, i.e., in a direction to pinch off fluid acting upon the exterior of ring 17.

It is understood that the surface of land 33 in contact with seat ring 17 as well as the surface of seat ring 17 contacted thereby are lapped flat so that no distortion is introduced into ring 17 by land 33. To facilitate lapping, land 33 may be formed as part of a separate ring (not shown) placed against the flat bottom of recess 18, either directly, or through the intermediary of a deformable washer to allow the separage ring to assume a position parallel with the contacting surface of ring 17.

Heating of seat ring 17 and the adjacent portions of primary sealing ring 14 and particularly of the contacting faces 16 and 29 is minimized by passing cooling fluid thereover through a passage 34 enclosing ring 17 in close proximity thereto and formed in gland plate 19. The cooling fluid in the form of seal illustrated herein is the fluid being sealed. It is contemplated, however, that the cooling fluid will not be used until the temperature of the primary and seat rings is high enough to cause thermal distortion in said rings. Upon start-ups, the maximum operating fluid pressure may be reached before any thermal distortion takes place. In this event, the negative moment will cause the outer edge of the primary seal face 16 to bind against face 29 of seat ring 17, but this is a temporary condition which is "corrected" by thermal distortion as the faces heat up. In a seal wherein the primary sealing washer has one inner diameter of 8-⅝" the distortion caused by the negative moment at 2,500 PSIG. may be 4.5 minutes of arc from the vertical, which, if allowed to remain would cause the seal to fail prematurely, but, because of the heat generated by such distortion, is soon removed by the thermal distortion.

If any one of the three properties, correct aspect ratio, hydro-pads and negative moment, is omitted from the design of a high pressure balanced end face seal, the seal will fail. For example, if the hydro-pads are omitted, the seal will burn up because of poor lubrication of the contacting faces. If the negative moment is omitted, the seal faces will separate and an unsatisfactorily high leakage rate will result. If one incorrect aspect ratio is used, the seal will have an unstable operation, with recurring popping open of the faces accompanied by sperts of fluid and high fluctuations in the power required to drive the seal.

The total area of the hydro-pads is a factor in determining the design of the primary sealing ring from the standpoint of balance. Thus, in a typical seal wherein the actual balance desired is 63-½% of the tone balance, the balancing effect of the pads will comprise a part of the 63-½% balance. Obviously, the balance to be produced by the pad cannot be concentrated in one pade since it would lead to dynamic unbalance of the rotating primary sealing ring. Consequently, once the required pad area is known, the number, configuration and spacing of each pad is then determined.

The ideal aspect ratio for high pressure seals for relatively large diameter shafts (6–8 inches) is 0.107 and this ratio may be varied up to 10%. For smaller sized shafts the aspect ratio may approach the upper limit of the range specified above, viz., 0.3.

I claim:

1. A rotary end face seal comprising relatively rotatable primary and seat rings having abutting radially disposed sealing surfaces, a support for the seat ring, means sealing a radially outer periphery of the seat ring with respect to the support, means limiting contact between the seat ring and the support in an axial direction to a radially outer region of the seat ring, the centroid of an axial section taken through a quadrant of the seat ring being located radially inward of the means limiting contact between the seat ring and support, the proportion which the radial width of the abutting radially disposed sealing surfaces bars to the inner radius of the contacting surfaces is in the range of 0.085 to 0.3, and at least one of said abutting surfaces is relieved radially inwardly from the pressure side of the seal at peripherally spaced intervals to form hydro-pads.

2. The combination defined in claim 1, said support for the seat ring having a recess to receive the seat ring, said recess having a cylindrical surface and a radially disposed surface, said means limiting contact between the seat ring and the support comprising a relief in said radially disposed surface extending radially outward beyond the radius at which the said centroid is disposed.

3. The combination defined in claim 1, a shaft extending through said primary ring, a stepped sleeve on said shaft, and a secondary seal disposed between the interior of the primary ring and the step on the shaft, said contacting surfaces being disposed partly radially inwardly of the step, and said primary ring having an axial quarter section the centroid of which is located axially between the primary ring secondary seal and the contacting faces, whereby to produce a negative moment of force about said centroid.

4. The combination defined in claim 1, the means sealing a radially outer periphery of the seat ring comprising an "O" ring disposed axially on the side of the centroid of the seat ring remote from the contacting faces to produce a negative moment of force about said seat ring centroid.

5. A rotary end face seal comprising relatively rotatable primary and seat rings having abutting radially disposed sealing surfaces, a support means for the seat ring, means sealing a radially outer periphery of the seat ring with respect to the support, the centroid of an axial half section of the seat ring being located radially inward of the support means for providing negative moment of said seat ring about its centroid; the radial width of the abutting radially disposed sealing surfaces having a ration to the inner radius of the contacting surfaces in the range of 0.085 to 0.3, and at least one of said abutting surfaces is relieved radially inwardly from the pressure side of the seal at peripherally spaced intervals.

6. A rotary end face seal comprising relatively rotatable primary and seat rings having abutting radially disposed sealing surfaces, means sealing a radially outer periphery of the seat ring with respect to the support, a support means adjacent the outer periphery of said seat ring and positioned radially outward of the centroid of an axial half section of the seat ring, the radial width of the abutting radially disposed sealing surfaces having a ratio to the inner radius of the contacting surfaces in the range of 0.085 to 0.3, and at least one of said abutting surfaces is relieved radially inwardly from the pressure side of the seal at peripherally spaced intervals to form hydro-pads.

* * * * *